E. G. ABBEY
APPARATUS FOR UTILIZING EXHAUST STEAM.
APPLICATION FILED MAY 23, 1917.
1,335,414.
Patented Mar. 30, 1920.
4 SHEETS—SHEET 1.
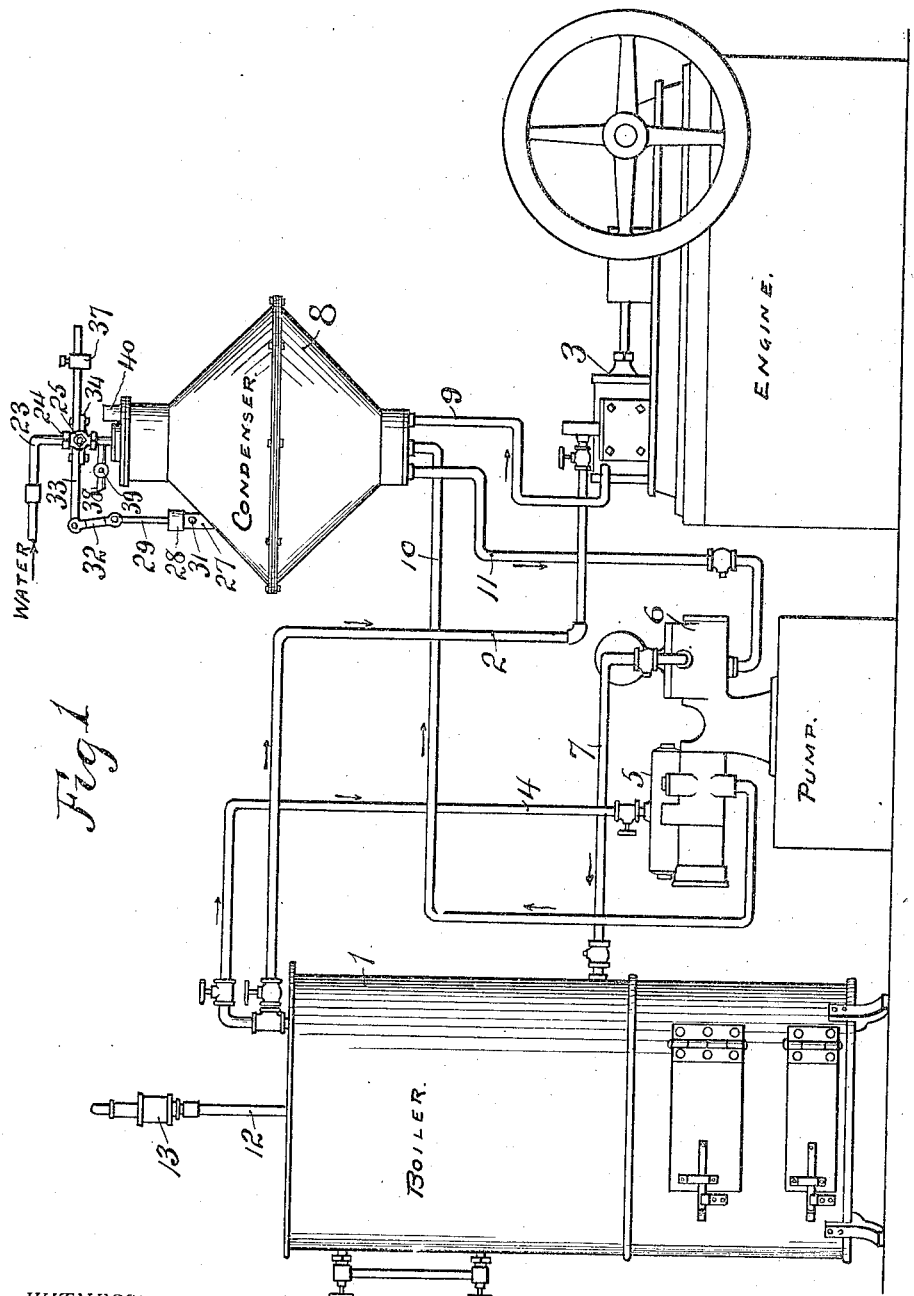

E. G. ABBEY.
APPARATUS FOR UTILIZING EXHAUST STEAM.
APPLICATION FILED MAY 23, 1917.
1,335,414.
Patented Mar. 30, 1920.
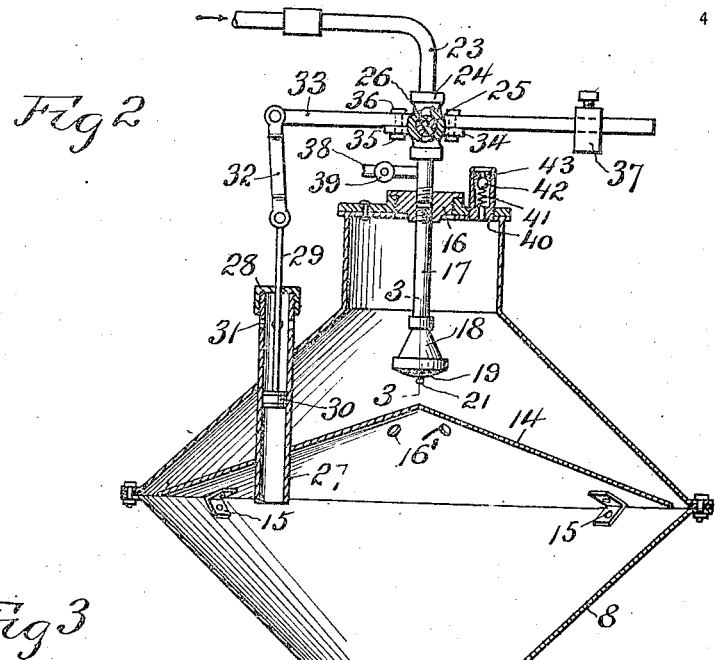
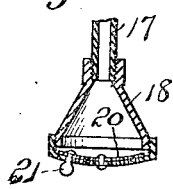
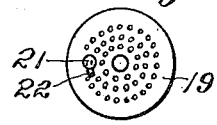
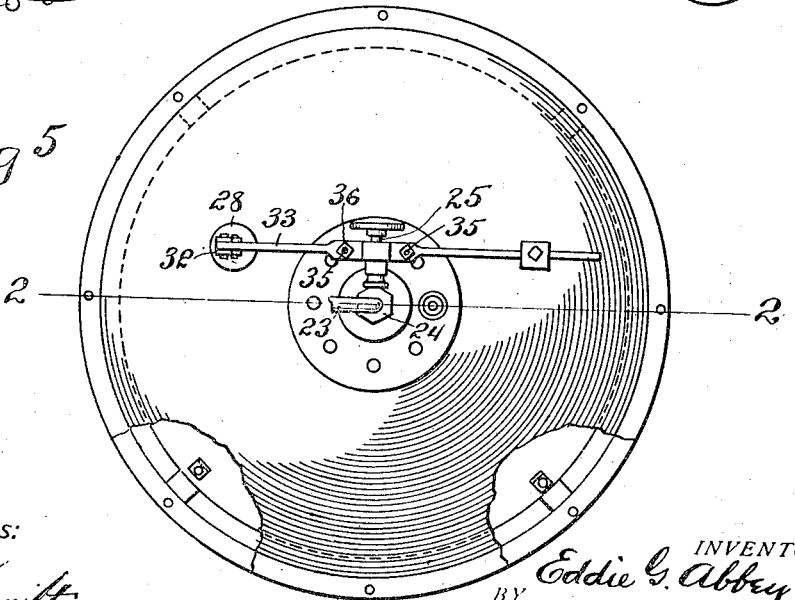
WITNESS:
R. E. Hamilton
INVENTOR.
Eddie G. Abbey
BY Warren D. House
His ATTORNEY

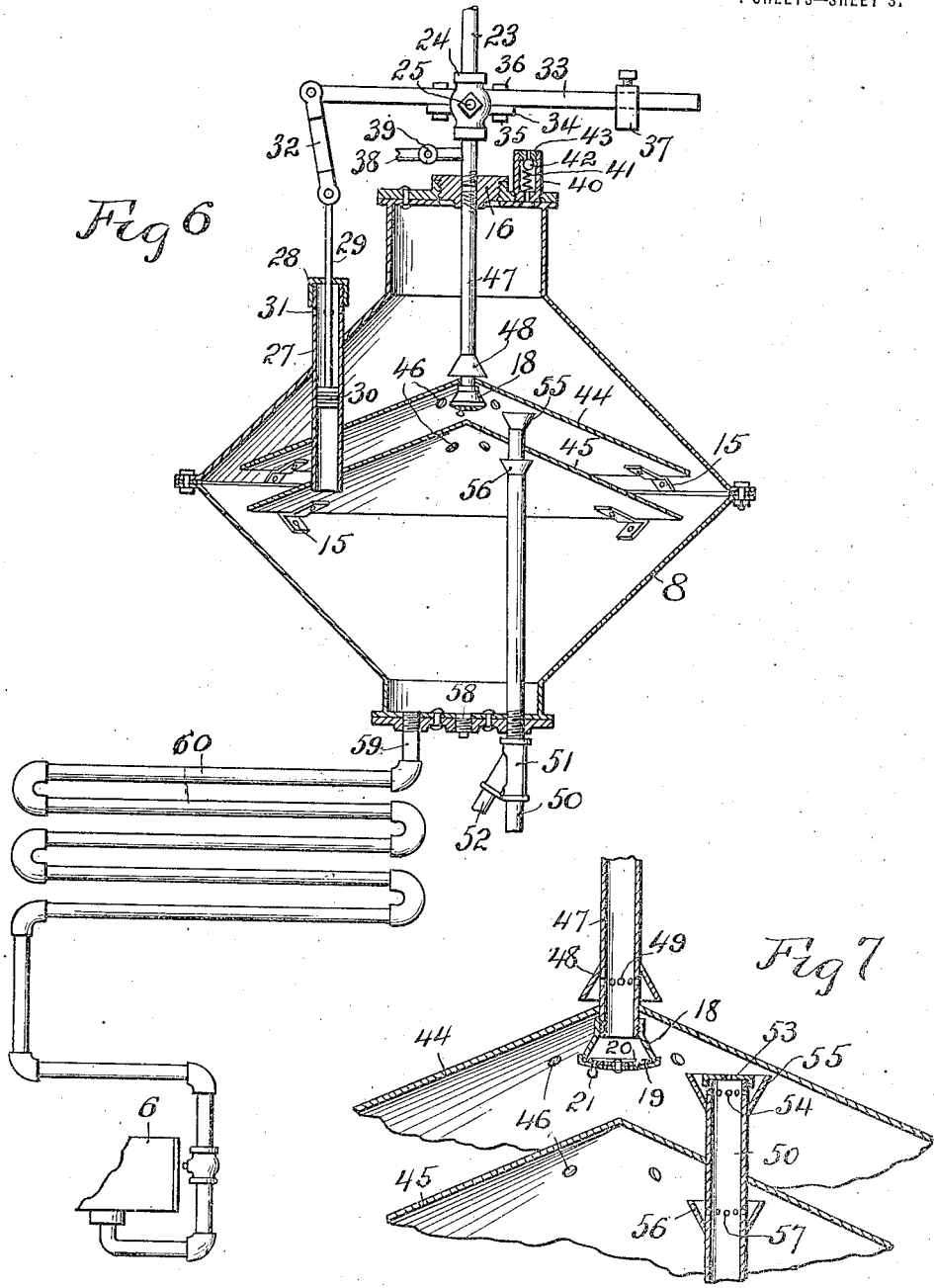

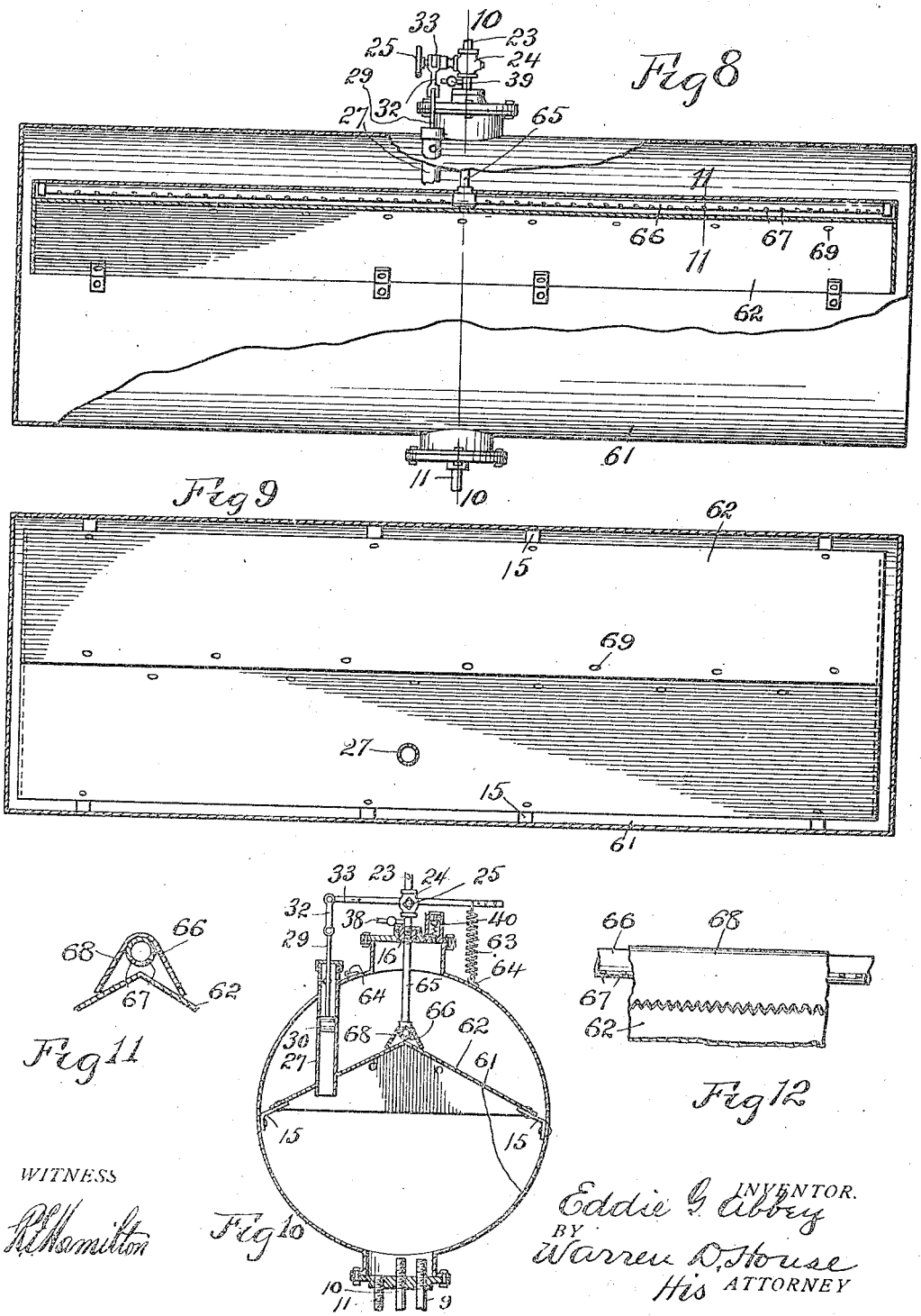

UNITED STATES PATENT OFFICE.

EDDIE G. ABBEY, OF MONETT, MISSOURI, ASSIGNOR OF ONE-FOURTH TO WM. SMERDON, ONE-FOURTH TO J. W. RUGGLES, AND ONE-FOURTH TO H. H. DAVIES, ALL OF MONETT, MISSOURI.

APPARATUS FOR UTILIZING EXHAUST-STEAM.

1,335,414.   Specification of Letters Patent.   Patented Mar. 30, 1920.

Application filed May 23, 1917. Serial No. 170,537.

*To all whom it may concern:*

Be it known that I, EDDIE G. ABBEY, a citizen of the United States, residing at Monett, in the county of Barry and State of Missouri, have invented a certain new and useful Improvement in Apparatus for Utilizing Exhaust-Steam, of which the following is a specification.

My invention relates to improvements in apparatus for utilizing exhaust steam.

It relates particularly to apparatus by which exhaust steam of an engine is partially condensed to water which is pumped back into the boiler which supplies the engine with live steam.

One object of my invention is to provide a novel means for economically utilizing the exhaust steam of an engine.

My invention provides further a novel apparatus which is simple in construction and economical and efficient in operation for utilizing the exhaust steam of an engine.

My invention further provides a simple, novel and efficient condenser for converting exhaust steam into a mist, thereby reducing the pressure and converting the steam into a form in which it can readily be pumped back in the boiler.

My invention further provides novel means for automatically controlling the feed into the condenser, of such water as may be required for supplying the needed amount of water lost by waste or leakage.

My invention still further provides novel means for retaining the pressure within the condenser within pre-determined limits.

My invention also provides in a condenser novel means by which the feed water fed therein is vaporized and intermingled with the mist produced by partial condensation of the exhaust steam which is discharged into the condenser.

Other novel features of my invention are hereinafter fully described and claimed.

In the accompanying drawings which illustrate my improved apparatus, adapted to carry into effect my improved method, Figure 1 is a side elevation of an apparatus, embodying the preferred form of my invention, Fig. 2 is an enlarged central vertical sectional view of the condenser shown in Fig. 1.

Fig. 3 is an enlarged vertical sectional view of the nozzle shown in Fig. 2.

Fig. 4 is a bottom view of the same.

Fig. 5 is a top view, partly broken away, of the condenser shown in Fig. 2.

Fig. 6 is a view partly in elevation and partly in vertical section of a modified form of my improved condenser and parts connected therewith.

Fig. 7 is an enlarged fragmental vertical sectional view of a portion of the condenser shown in Fig. 6.

Fig. 8 is a view partly in side elevation and partly in vertical section of another modification of my improved condenser.

Fig. 9 is a view partly in horizontal section and partly in plan of the condenser shown in Fig. 8.

Fig. 10 is a cross section on the line 10—10 of Fig. 8, some of the distant parts being also shown in vertical section.

Fig. 11 is an enlarged vertical sectional view on the line 11—11 of Fig. 8.

Fig. 12 is an enlarged side elevation of a portion of the water distributer shown in Fig. 8.

Similar reference characters designate similar parts in the different views.

Referring particularly to Figs. 1 to 5, 1 designates an ordinary boiler connected by a steam pipe or conductor 2 with the steam chest of an ordinary steam engine 3.

A branch conductor 4 connected with the conductor 2 is connected with the steam chest 5 of an ordinary steam pump having a pumping cylinder 6, the outlet port of which is connected by a conductor 7 with the boiler 1, at a point, preferably below the water level in the boiler.

8 designates the shell of a steam condenser, which may be of any desired shape and which is provided with two inlets in the bottom thereof in which there are respectively fitted two conductors 9 and 10 which respectively communicate with the exhaust ports of the steam engine and the steam pump.

The bottom of the shell 8 has fitted in it a conductor 11 which communicates with the inlet port of the pump cylinder 6.

The upper end of the boiler 1 has extending through it a pipe 12, on which is removably secured an ordinary safety valve 13 which may be detached, so that the boiler may be preliminarily filled with water through the pipe 12.

Extending transversely across the interior of the shell 8 is a baffle member preferably comprising a conical plate 14, having its convex side up and supported by brackets 15 secured to the inner wall of the shell 8. The edge of the plate 14 is spaced apart from the inner wall of the shell 8, so as to permit steam to pass from the under side to the upper side of the plate. For this purpose, there may also be provided perforations 16' in the plate.

The exhaust steam from the engine and the steam cylinder of the steam pump enters the shell 8 through the conductors 9 and 10. It is desired that this exhaust steam shall be condensed to the form of water, so as to enable it to be readily pumped back into the boiler 1, and also reduce its pressure to approximately atmospheric, or above or below atmospheric pressure, as may be desired.

The size and the manner of cooling the shell 8 of the condenser may be such that the exhaust steam will be reduced to the proper pressure and to mist form without the introduction of any water to the interior of the shell 8. In order, however, that this shell may be relatively of small size and yet efficient for the purpose, I provide novel means by which feed water may be discharged either automatically or by hand control upon the upper side of the baffle member 14. For effecting this function, the following described mechanism may be employed:

The top of the shell 8 has a screw-threaded hole in which is fitted a screw plug 16, Fig. 2. Fitted in the screw plug 16 and projecting downwardly therefrom is a pipe 17, on the lower end of which is fitted a nozzle or sprinkler 18, having a perforated bottom 19 upon the upper side of which is rotatably fitted a perforated plate 20, Fig. 3, to which is secured a thumb piece 21 which extends through a slot 22, Fig. 4. By turning the plate 20 to certain positions, the perforations therein may be disposed in or out of register with the perforations in the plate 19. The discharge of water from the nozzle or sprinkler may thus be entirely shut off or, by adjustment of the thumb piece 21, the water discharged from the nozzle may be regulated as to volume.

A conductor 23 is connected with a source of water supply, not shown, and has its discharge end fitted in the plug 16. The conductor 23 embodies the casing 24 of an ordinary globe valve, in which casing is oscillatively mounted a valve 25 having a transverse water passage 26 adapted to register with the central vertical passage through the valve casing 24. By turning the valve from such registering position, the water supplied to the nozzle 18 may be regulated or entirely shut off. In order that this may be automatically controlled by the pressure in the shell 8, the latter has extending through its upper side a cylinder 27 having a screw-threaded upper end, on which is fitted a cap 28, having a central vertical hole in which is loosely fitted a vertical slidable piston rod 29, to the lower end of which is secured a piston head 30, slidably mounted in the cylinder 27 and movable upwardly in the cylinder by steam pressure in the shell 8.

The cylinder 27 near its upper end and below the cap 28 is provided with one or more perforations 31, through which steam may escape in case that the steam pressure forces the piston head 30 above said perforations.

A link 32 has its lower end pivoted to the upper end of the rod 29, its upper end being pivoted to one end of a horizontally disposed lever 33 which is clamped to the upper side of the stem of the valve 25 by a plate 34 which bears against the under side of the valve stem and is secured to the lever 33 by bolts 35, provided with nuts 36.

Adjustably mounted on the lever 33 is a slidable counterbalance weight 37, which may be disposed at either side of the valve casing 24 on the lever 33, so as to add its weight to the weight of the piston head 30, when it is desired to operate the condenser at a pressure above atmospheric. When placed at the opposite side of the valve casing, as shown in Fig. 2, the weight 37 may be adjusted to wholly or partially counterbalance the weight carried by the opposite side of the lever 33.

In order that the nozzle 18 may, when desired, be supplied with water, by hand control, the conductor 23 between the plug 16 and the valve casing 24, is provided with branch conductor 38, which is connected with the source of water supply, and which is provided with a shut-off cock 39.

In the operation of my invention, the exhaust steam entering the shell 8 through the conductors 9 and 10 strikes the under side of the baffle member 14 and passes upwardly around the edge of the latter and through the perforations 16'. As the pressure in the shell 8 increases, the piston head 30 is forced upwardly until the valve 25 is opened, at which time water passes from the conductor 23 through the plug 16, pipe 17 and into the nozzle 18, from which it is sprayed upon the upper side of the baffle member 14, thereby chilling the baffle member and condensing the exhaust steam into water, the water so sprayed being converted into water which mixes with the water of the exhaust steam and is then pumped from the shell 8 through the conductor 11, pump cylinder 6 and conductor 7, directly into the boiler 1 below the water level therein.

When the pressure in the shell is reduced to a pre-determined point, due to the partial condensation of the steam, the pressure of the air entering the cylinder 27 through the perforations 31 will force the piston head 30 downwardly, thus swinging the lever 33, so as to turn the valve 25 to the closed or to a partially closed position.

By means of this arrangement, the feed water, which may be required to replace the water lost through leakage, is heated by the exhaust steam, which in turn is condensed to water form through the absorption of a portion of its heat by the feed water. The shell 8 being air tight, no exhaust steam escapes to the atmosphere, in the normal operation of the apparatus, so that the fuel and energy are conserved.

By loosening the nuts 36, the valve 25 may be rotatably adjusted to a position between the lever 33 and the clamping plate 34, such that the amount of feed water supplied to the condenser will effect such a condensation of the exhaust steam that the pressure in the shell 8 will, at no time, be sufficient to force the piston head 30 above the perforations 31. The temperature of the feed water, the size of the shell 8, and the atmospheric conditions exercise an influence upon the operation of the automatic feed water controlling mechanism. This, as above described, may be adjusted to meet the prevailing conditions.

In order that the pressure within the shell 8 may be retained within pre-determined limits, and prevented from falling too low, when the pump is first started, I provide the following described mechanism:

In the top of the shell 8 is a screw-threaded hole, in which is fitted the screw-threaded lower end of a tube 40, Fig. 2, in which is supported a coil spring 41, which in turn supports a ball valve 42, which is normally held by the spring 41, against the valve seat provided in the lower side of a tubular screw plug 43, which is fitted in the screw-threaded upper end of the tube 40. When the pressure in the shell 8 falls to a predetermined point, which is determined by the position to which the tubular plug 43 has been adjusted, the external air pressure forces the valve 42 downwardly from its seat, thereby permitting air from the atmosphere to pass through the tubular plug 43 and tube 40 into the shell 8.

The form of my invention shown in Figs. 6 and 7 differs from that shown in Figs. 1 and 2 in the following particulars. In lieu of a single baffle member, there are provided in the shell 8, two conical baffle members 44 and 45 disposed one above the other, and corresponding in shape to the baffle member 14 are supported by brackets 15 which are secured to the inner wall of the shell 8.

Each baffle member 44 and 45 may be provided with perforations 46 which correspond in function to the perforations 16.

In lieu of the pipe 17, there is provided a pipe 47, the upper end of which is fitted in the plug 16. The pipe 47 extends through a vertical hole provided in the baffle member 44 and has fitted to its lower end a nozzle 18, such as I have already described. This nozzle discharges upon the upper side and central portion of the baffle member 45.

The pipe 47 above the baffle member 45 is provided with a funnel-shaped deflector 48. The pipe 47 intermediate of the deflector 48 and the baffle member 44 is provided with perforations 49, through which water passes and is deflected downwardly upon the member 44 by the deflector 48.

In lieu of the exhaust pipe 9, there is provided a conductor 50 which connects with the exhaust port of the steam engine and extends through one of the inlets of the shell 8 and upwardly through the lower baffle member 45. The conductor 50 is provided with a Y 51, into which discharges a conductor 52, which is connected to the exhaust port of the steam pump in the same manner as the conductor 10 in the form of my invention shown in Fig. 1.

The top of the conductor 50 is provided with a cap 53 having a central perforation and located intermediate of the baffle members 44 and 45. The conductor 50 below the cap 53 is provided with perforations 54, which are encircled by a funnel-shaped deflector 55, located between the members 44 and 45. The conductor 50, below the member 45 has mounted on it a funnel-shaped deflector 56, which encircles perforations 57 provided in the conductor 50.

The other inlet for exhaust steam is normally closed by a screw plug 58, Fig. 6. In lieu of the conductor 11, I provide a conductor 59, which connects with the inlet port of the pump cylinder 6, and which is provided with a sinuous portion 60, designed to increase the cooling surface to which the mist passing from the condenser to the pumps is exposed.

The exhaust steam from the steam engine and the steam pump passes into the shell 8 through the conductor 50 and conductor 52. The water passing from the conductor 23 enters the pipe 47 and is discharged upon the upper sides of the baffle members 44 and 45. The exhaust steam, which is discharged from the conductor 50 below the members 44 and 45 and above the member 45 is condensed to mist which mingles with the mist created from the water discharged upon the baffle members 44 and 45. The mixture is pumped through the conductor 59 into the pumping cylinder 6 and is then discharged, as already described, into the boiler 1 through the conductor 7.

The operation of this form of my invention is the same as the form of my invention shown in Fig. 2, with the exceptions above described.

In the form of my invention shown in Fig. 8, the condenser shell 61 is a horizontal closed cylinder having mounted in it a horizontal longitudinal baffle member 62, conical in cross section and supported by brackets 15 secured to the inner side walls of the shell 61. The valve controlling mechanism, in this form of my invention, shown in Figs. 8 to 12, is the same as that shown in Figs. 2 and 6, with the exception that for the weight 37 there is substituted a coil spring 63, the lower end of which is adapted to be connected with either one of two clips 64, which are secured to the top of the shell 61 at opposite sides respectively of the valve casing 24. The spring 63 is adapted to have its upper end connected to the lever 33 at different points and at different sides of the pivotal center thereof.

In lieu of the pipe 17 shown in Fig. 2, there is provided, in the form shown in Figs. 8 and 10 a vertical pipe 65 mounted in the screw plug 16 and supporting at its lower end a horizontal pipe 66, into which the pipe 65 discharges, and which is provided with perforations 67 in its lower side, and which is closed at both ends.

The pipe 66 is located just above and parallel with the ridge of the baffle member 62. The perforations 67 are arranged in two longitudinal rows, Fig. 11, which respectively discharge upon the two sloping top portions of the member 62.

An inverted V-shaped deflector 68 is mounted upon the pipe 66 and extends parallel therewith, and is provided preferably with serrated lower edges, which rest respectively upon the two sloping portions of the baffle member 62. Said sloping portions may be provided with perforations 69 which permit exhaust steam to pass above the member 62 through said member as well as between the lower edges thereof and the shell 61.

In the operation of the form of my invention shown in Figs. 8 to 12, the exhaust steam entering the shell 61 from the conductors 9 and 10 passes upwardly through the perforations 69 and through the space provided between the edges and ends of the baffle member 62 and the shell 61. The exhaust steam is converted into water which mingles with the water which passes through the conductor 23, pipe 65 and pipe 66, and which is discharged through the openings 67 of the latter upon the sloping top portions of the member 62. The mixture is pumped, as already described, with reference to the form shown in Fig. 2, through the conductor 11 to the pump and thence through the conductor 7 into the boiler 1. The mechanism for controlling the water supplied to the shell 61, is the same as that shown in Fig. 2, with the exception of the substitution of the spring 63 for the weight 37, and the means for connecting the spring to the lever and shell 61. The spring 63 normally exerts a tension such as will draw downwardly on the lever 33.

I do not limit my invention to the structure shown and described, as modifications, other than those shown, within the scope of the appended claims, may be made without departing from the spirit of my invention.

What I claim is:—

1. A condenser comprising a shell having a steam inlet, means providing a chilling film, means relieving the shell of the condensate, and pressure operated mechanism controlling the chilling film and relieving excess pressure within the shell.

2. A condenser comprising a shell having a steam inlet, means providing a chilling film, means relieving the shell of condensate, means admitting air to the shell when the pressure therein falls below a predetermined point, and pressure operated mechanism controlling the chilling film and relieving excess pressure within the shell.

3. A condenser comprising a shell having a steam inlet, means providing a chilling film, means relieving the shell of the condensate, and means operated by the excess pressure within the shell to increase the chilling effect and relieve said excess pressure to the atmosphere and operated by the atmospheric pressure to decrease the chilling effect and cut off the atmospheric relief when the pressure within the shell is at or below atmospheric pressure.

4. A condenser comprising a shell having a steam inlet, means providing a chilling film, means relieving the shell of the condensate, means admitting air to the shell only when the pressure therein falls below a predetermined point, and means operated by excess pressure within the shell to increase the chilling effect and diminish the pressure by release to the atmosphere and operated by atmospheric pressure to decrease the chilling and cut off the atmospheric relief when the pressure within the shell falls to or below atmospheric pressure.

5. A condenser including an air-tight shell, a water pipe leading into the shell, means for controlling flow through said pipe, a steam pipe leading into the shell, means whereby the contents of the shell may be drawn therefrom, and means operable by steam pressure within the shell for opening said first mentioned means, said last mentioned means being movable to a position for venting the shell.

6. A condenser including an air-tight shell, a water pipe leading into the shell, means for controlling flow through said pipe, a steam pipe leading into the shell, means whereby the contents of the shell may may be drawn therefrom, means operable by steam pressure within the shell for opening said first mentioned means, and means associated with said last mentioned means whereby the shell will be vented when the steam pressure therein becomes excessive.

7. A condenser including an air-tight shell, a water pipe leading into the shell, means for controlling flow through said pipe, a steam pipe leading into the shell, means whereby the contents of the shell may be withdrawn therefrom, and means operable by steam pressure within the shell for opening said first mentioned means, said last mentioned means providing a valve for automatically controlling the venting of the shell when the steam pressure therein becomes excessive.

8. A condenser including an air-tight shell, a water pipe leading into the shell, means for controlling flow through said pipe, a steam pipe leading into the shell, means whereby the contents of the shell may be withdrawn therefrom, a cylinder extending into the shell to communicate therewith and provided with an opening establishing communication between the outer end portion of the cylinder and the outer air, and a piston slidable in said cylinder and operatively connected with said first mentioned means whereby steam pressure within the shell will act upon the piston for opening said first mentioned means, the piston being movable to a position beyond said opening in the cylinder for venting the shell when the steam pressure therein becomes excessive.

9. A condenser including an air-tight shell, a water pipe leading into the shell, means for controlling flow through said pipe, a steam pipe leading into the shell, means whereby the contents of the shell may be withdrawn therefrom, means operable by steam pressure within the shell for opening said first mentioned means and also operable by atmospheric pressure for closing such means when said steam pressure is reduced below atmospheric, and means associated with said last mentioned means for varying the pressure at which said first mentioned means will be opened.

10. A condenser including an air-tight shell, a water pipe leading into the shell, a valve for controlling flow through said pipe, a steam pipe leading into the shell, means whereby the contents of the shell may be withdrawn therefrom, reciprocable means operable by steam pressure within the shell, and an operative connection between said last mentioned means and the valve whereby the valve will be opened upon the rise of steam pressure within the shell, said connection including an element adjustably engaged with the valve whereby the opening movement of the valve may be varied for a given throw of said last mentioned means from normal position.

11. In a condenser, a shell comprised of separable oppositely presented conical sections secured together at their bases, a conical baffle disposed within the shell at the juncture of the sections whereby to provide the largest possible surface within the shell, means disposing a chilling film over the entire surface of said baffle, means admitting the vapor to be condensed on one side of said baffle, said baffle being spaced apart from the sections at its periphery, and means relieving the shell of the condensate.

12. In a condenser, the combination of an air-tight shell, a water pipe leading into the shell, means operable in one direction by steam pressure and in the opposite direction by air pressure for controlling flow through said pipe, and means for automatically maintaining pressure within the shell above a predetermined minimum.

In testimony whereof I have signed my name to this specification.

EDDIE G. ABBEY.